United States Patent [19]

Harada et al.

US005794114A

[11] Patent Number: 5,794,114
[45] Date of Patent: Aug. 11, 1998

[54] OZONIZER

[75] Inventors: Minoru Harada; Ryoichi Shinjo; Manabu Tsujimura; Rempei Nakata, all of Kanagawa; Kunihiro Miyazaki, Tokyo; Naruhiko Kaji, Kanagawa, all of Japan

[73] Assignees: Ebara Corporation, Tokyo; Kabushiki Kaisha Toshiba, Kawasaki, both of Japan

[21] Appl. No.: 517,879

[22] Filed: Aug. 23, 1995

[30] Foreign Application Priority Data

Aug. 24, 1994 [JP] Japan .................... 6-224150

[51] Int. Cl.$^6$ ...................................... B01J 19/08
[52] U.S. Cl. .......................... 422/186.1; 422/186.07
[58] Field of Search ................. 422/186.07–186.2, 422/168, 169, 170, 173

[56] References Cited

U.S. PATENT DOCUMENTS

| | | | |
|---|---|---|---|
| 4,282,172 | 8/1981 | McKnight | 261/76 |
| 4,898,715 | 2/1990 | Jacob | 422/186.29 |
| 4,970,056 | 11/1990 | Wooten et al. | 422/186.07 |
| 5,205,994 | 4/1993 | Sawamoto et al. | 422/186.07 |
| 5,268,151 | 12/1993 | Reed, deceased et al. | 422/186.16 |
| 5,274,414 | 12/1993 | Iwanaga | 313/631 |
| 5,332,555 | 7/1994 | Hosokawa et al. | 422/186.05 |
| 5,374,404 | 12/1994 | Weigold et al. | 422/186.3 |
| 5,387,775 | 2/1995 | Kang | 219/121.52 |
| 5,417,826 | 5/1995 | Blalock | 204/176 |
| 5,417,936 | 5/1995 | Suzuki et al. | |
| 5,529,760 | 6/1996 | Burris | 422/186.07 |
| 5,549,874 | 8/1996 | Kamiya et al. | 422/186.04 |

FOREIGN PATENT DOCUMENTS

| | | |
|---|---|---|
| 567 114 | 10/1993 | European Pat. Off. . |
| 3174301 | 7/1991 | Japan . |
| 6-21010 | 3/1994 | Japan . |
| 6227802 | 8/1994 | Japan . |

OTHER PUBLICATIONS

Grant and Hackh's Chemical Dictionary, 5th ed., McGraw and Hill, New York, 1987, p. 553, 1987 No Month Available.

*Primary Examiner*—Charles T. Jordan
*Assistant Examiner*—John R. Hardee
*Attorney, Agent, or Firm*—Armstrong, Westerman, Hattori, McLeland & Naughton

[57] ABSTRACT

In an improved ozonizer, at least those parts of an ozone gas delivery path located downstream of an ozone generating cell which are to come into contact with ozone gas are either composed of or coated with at least one ozone-resistant, Cr-free material selected from among aluminum (Al), an aluminum alloy, Teflon, fluorinated nickel, a nickel alloy, a silicon oxide based glass and a high-purity aluminium oxide. The ozonizer is capable of producing ozone that is not contaminated with Cr compounds at all or which is insufficiently contaminated to cause any practical problem in the fabrication of highly integrated semiconductor devices.

11 Claims, 2 Drawing Sheets

OZONIZER

BACKGROUND OF THE INVENTION

This invention relates to an ozonizer for producing a high-purity ozone gas suitable for use in the semiconductor fabrication process and other applications.

In ozonizers of the type contemplated by the invention which are capable of producing high-purity ozone gas, stainless steel has been used as a constituent material of the parts which are to come into contact with the ozone gas. Since the semiconductor fabrication process avoids the emission of particles and out-gases, stainless steel which has been subjected to electropolishing is used.

A problem with the use of stainless steel materials in those parts of an ozonizer which are to come into contact with the ozone gas is that very small amounts of chromium (Cr) compounds are contained in the product ozone gas. A plausible reason for the generation of Cr compounds is that since oxygen ($O_2$) gas supplemented with nitrogen ($N_2$) gas is used as a feed gas, NOx is produced by the nitrogen within ozone generating cells and the resulting NOx reacts with the very small amount of water which is adsorbed on the surface of the stainless steel, thereby yielding nitric acid which, in turn, reacts with the stainless steel to produce Cr compounds. In addition to NOx, SOx and HF are expected to form if $CF_4$, $SF_6$ and $NF_3$ are added to oxygen ($O_2$) gas and this would be another cause of the production of Cr compounds.

The contamination of ozone gas with small amounts of Cr compounds has not been a particular concern in the semiconductor fabrication process. However, with the recent expansion of the scope of applications of ozone gas, the Cr compounds in the ozone gas used in the semiconductor fabrication process are becoming a problem and yet there is still no effective means available today for dealing with the problem.

SUMMARY OF THE INVENTION

The present invention has been accomplished under these circumstances and has as an object providing an ozonizer capable of generating ozone gas that is significantly reduced in the content of Cr compounds.

This object of the invention can be attained by an ozonizer that comprises the following: an ozone generating cell which generates ozone gas upon supply of a feed gas and application of a high voltage from a high-voltage source; an ozone gas delivery path through which the generated ozone gas is delivered, characterized in that the ozone gas delivery path (consisting of pipes 22 and 23, a gas filter 15 and a pipe 24 as shown in FIG. 1) which is located downstream of the ozone generating cell 11 uses a Cr-free material in at least those parts which are to come into contact with the ozone gas.

In an embodiment of the invention, those parts of the ozone gas delivery path which are to come into contact with the ozone gas are composed of at least one material selected from among aluminum (Al), an aluminum alloy, Teflon, fluorinated nickel (Ni), a nickel alloy, a silicon oxide ($SiO_2$) based glass and a high-purity aluminum oxide ($Al_2O_3$) such as high-purity sapphire.

In another embodiment of the invention, those parts of the ozone gas delivery path which are to come into contact with the ozone gas are coated with at least one material selected from among aluminum (Al), an aluminum alloy, Teflon, fluorinated nickel (Ni), a nickel alloy, a silicon oxide ($SiO_2$) based glass and a high-purity aluminum oxide ($Al_2O_3$) such as high-purity sapphire.

In yet another embodiment of the invention the ozone generating cell is supplied with a feed gas which is either an oxygen gas containing or supplemented with nitrogen or a compound thereof or an oxygen gas containing fluorine or supplemented with fluorine or a compound thereof or both types of oxygen gas.

In still another embodiment of the invention, at least those parts of the ozone gas flow path extending from the ozonizer to a process using the ozone gas generated in said ozonizer which are to come into contact with the ozone gas use at least one material selected from among aluminum (Al), an aluminum alloy, Teflon, fluorinated nickel, a nickel alloy, a silicon oxide based glass, and a high-purity aluminum oxide ($Al_2O_3$) such as high-purity sapphire.

In the ozonizer of the invention, the ozone gas delivery path which is located downstream of the ozone generating cell uses a Cr-free material in at least those parts which are to come into contact with the ozone gas and this construction ensures that Cr compounds will not be generated in the ozone gas delivery path downstream of the ozone generating cell, thereby eliminating the possibility that the high-purity ozone gas produced in the ozone generating cell is contaminated with Cr compounds.

DESCRIPTION OF THE PREFERRED EMBODIMENT

Figure 1:
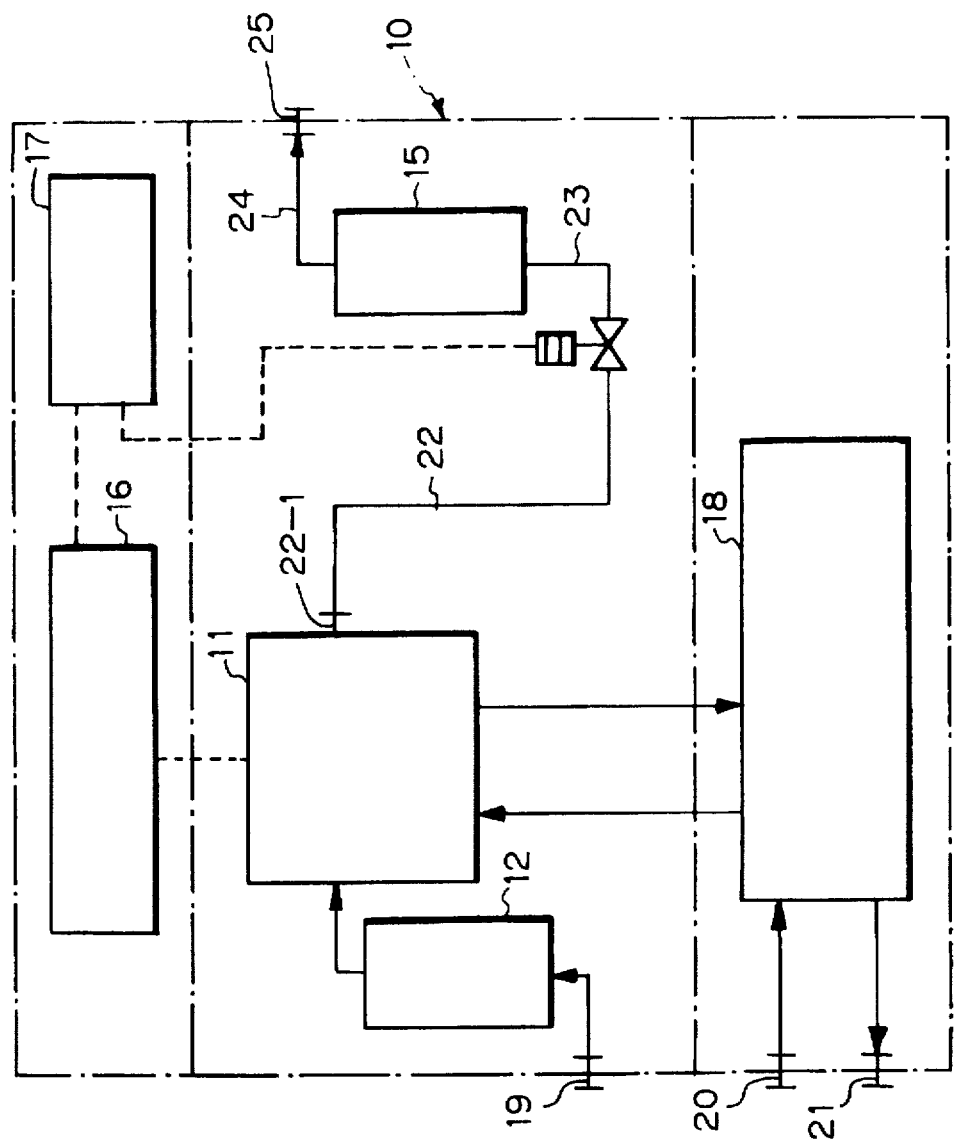
FIG. 1 is a schematic layout of the ozonizer of the invention.

The preferred embodiment of the invention will now be described with reference to the accompanying drawings. FIG. 1 is a schematic layout of the ozonizer of the invention. As shown, the ozonizer generally indicated by 10 comprises an ozone generating cell 11, a feed gas supply unit 12, a gas filter 15, a high-frequency, high-voltage source 16, a control unit 17 and a chiller unit 18.

The ozone generating cell 11 contains one or more unit cells (not shown), each of which is connected to a pressure regulating valve 14 via a pipe 22. The pressure regulating valve 14 is connected to the gas filter 15 via a pipe 23, and the gas filter 15 is connected to an ozone gas outlet 25 via a pipe 24. A joint is shown by 22-1. Pipe 22, joint 22-1, pressure regulating valve 14, pipe 23, gas filter 15 and pipe 24 form an ozone gas delivery path through which ozone gas is delivered from the ozone generating cell 11. As will be described hereinafter, those parts of the ozone gas delivery path which are to come into contact with ozone gas use a Cr-free material.

The feed gas supply unit 12 is such that the feed gas being supplied through a feed gas inlet 19 is introduced into the ozone generating cell 11 at a specified flow-rate. The high-frequency, high-voltage source 16 applies a high-frequency, high voltage to the electrodes of the ozone generating cell 11 under the control of the control unit 17. The pressure regulating valve 14 regulates the pressure in the ozone generating cell 11 at a specified level under the control of the control unit 17. The gas filter 15 removes particles and other impurities contained in the ozone gas being sent from the ozone generating cell 11.

The chiller unit 18 supplies the ozone generating cell 11 with circulating deionized water. The chiller unit 18 is so adapted that cooling water flows in through an inlet 20 and flows out through an outlet 21. The introduced cooling water cools the deionized water from the ozone generating cell 11 and sends it back to the cell. In this way, the heat generated by a discharge such as silent discharge that develops within the ozone generating cell 11 can be removed, thereby cooling the cell.

In the thus constructed ozonizer, the ozone generating cell 11 is supplied not only with a specified high-frequency, high voltage from the power source 16 under the control of the control unit 17 and a feed gas from the supply unit 12 and ozone gas is generated in the cell. The generated ozone gas flows through the pipe 22 and passes through the pressure regulating valve 14 to enter the gas filter 15. After being freed of particles and other impurities by means of the filter 15, the ozone gas flows through the pipe 24 and leaves the ozonizer 10 through the outlet 25 to be sent to a subsequent process, say, a semiconductor fabrication process.

As already mentioned, the ozone gas delivery path which is located downstream of the ozone generating cell 11 consists of the pipe 22, joint 22-1, pressure regulating valve 14, pipe 23, gas filter 15 and pipe 24 and those parts of the ozone gas delivery path which are to come into contact with ozone gas use of a Cr-free material. Therefore, if the ozone gas generated by the ozone generating cell 11 is free from Cr compounds, it can be sent to the subsequent process through the outlet 25 as an entity that is free from Cr compounds and which hence is not contaminated by Cr compounds.

In an experiment with the ozonizer of the invention that used a Cr-free material in the pipe 22, joint 22-1, pressure regulating valve 14, pipe 23, gas filter 15 and pipe 24, the ozone gas being sent out through the outlet 25 was found to be contaminated with Cr in no more than $1 \times 10^{10}$ atms/cm$^2$ as measured by the method to be described hereinafter.

Constituent Materials

Joint 22-1 and pressure regulating valve 14 used a stainless steel (SUS 316) as a base metal, which had a Ni coating in the areas that were to come into contact with ozone gas. Pipe 22 was made of Teflon (PFA); pipes 23 and 24 were made of pure aluminum (Al050); and gas filter 15 was made of Teflon (PTFE, PFA).

To measure the quantity of Cr contamination, a Teflon chamber 37 (see FIG. 2) containing a silicon wafer 38 was supplied with ozone gas that was blown from the ozonizer described above, and the surface of the silicon wafer 38 was analyzed by total reflecting fluorescent X-rays; the Cr contamination was found to be less than the limit of detection with total reflecting fluorescent X-rays ($<1 \times 10^{10}$ atms/cm$^2$). In a comparative experiment on the ozone gas from a prior art ozonizer which used stainless steel in the ozone gas delivery path located downstream of the ozone generating cell, Cr was detected in amounts ranging from $1 \times 10^{12} - 1 \times 10^{13}$ atms/cm$^2$.

Figure 2:
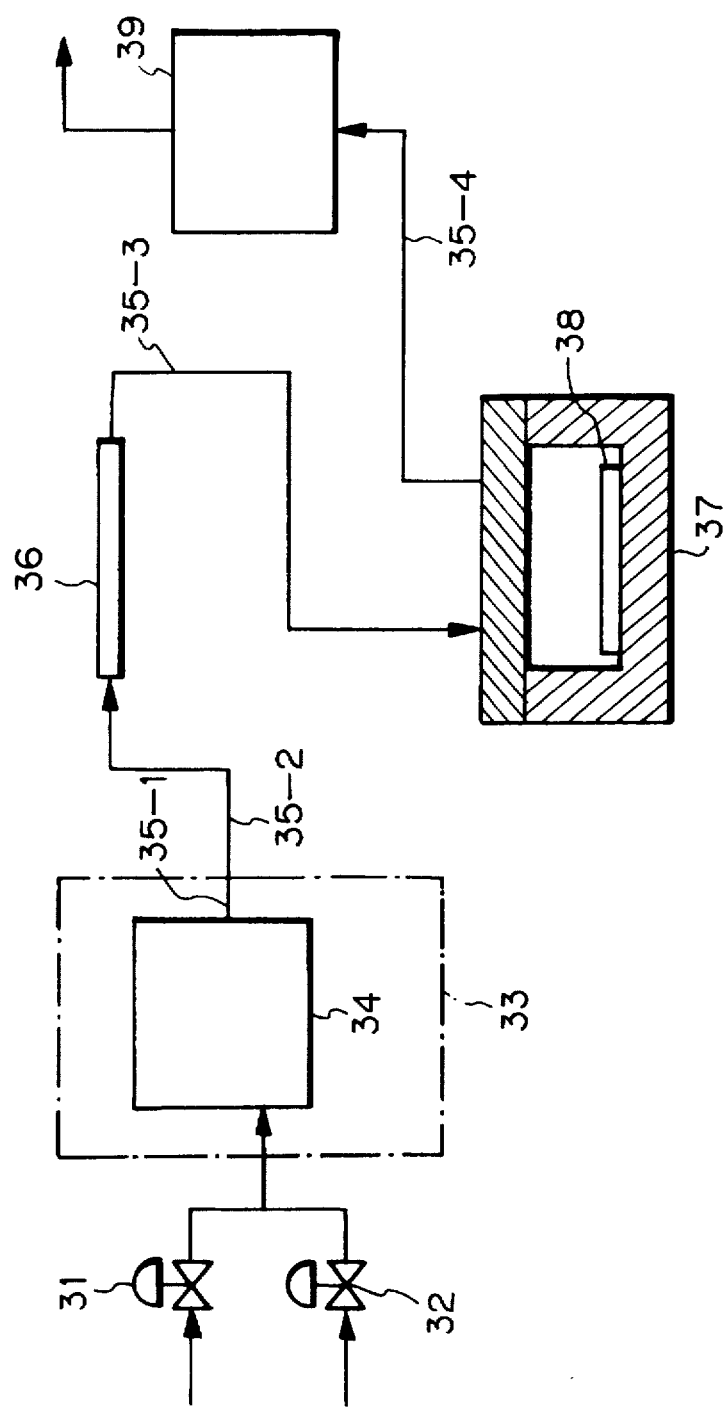
FIG. 2 is a schematic representation of a system for checking the quantity of Cr contamination.

FIG. 2 is a schematic representation of a system for checking the amount of Cr contamination from various materials used in the ozone gas delivery path located downstream of the ozone generating cell 34 in an ozonizer 33. The ozone generating cell 34 which was supplied with a high-frequency, high voltage between electrodes was also supplied with oxygen and nitrogen gases at given flow rates; the oxygen gas was supplied from an $O_2$ gas mass flow controller and the nitrogen gas was supplied from a $N_2$ gas mass flow controller 32. The ozone gas generated in the cell 34 passed through Teflon pipes 35-1 and 35-2, a test pipe 36 and Teflon pipe 35-3, from which it was blown into the Teflon chamber 37; the ozone gas from the Teflon chamber 37 was directed through a Teflon pipe 35-4 to enter an ozone cracking column 39, from which a cracked ozone gas would emerge.

The chamber 37 contained a silicon wafer 38 and the amount of Cr deposit on the surface of the silicon wafer 38 was analyzed by a total reflecting fluorescent X-ray analyzer (not shown) to check the amount of Cr contamination. The test pipe 36 (for the specific names of the materials of which it was made, see below) was tested under the following conditions.

Test Conditions

| | |
|---|---|
| Ozone gas concentration: | 8 vol % |
| Feed gas flow rate: | 10 NL/min |
| Pressure in ozone generating cell: | atmospheric pressure |
| Feed gas: | 0.8 vol % $N_2$ containing oxygen |
| Feed gas purity: | 99.9995% for both oxygen ($O_2$) and nitrogen ($N_2$) |
| Ozone gas blow time: | 10 min |
| Diameter of silicon wafer 38: | 6 inch |

The results of measurement of Cr contamination were as follows.

Test Results (1) Cr contamination in the case where the test pipe 36 was a stainless steel pipe (electropolished SUS 316L pipe): $1 \times 10^{12} - 1 \times 10^{13}$ atms/cm$^2$;

(2) Cr contamination in the case where the test pipe 36 was an aluminum (Al050) pipe: $<1 \times 10^{10}$ atms/cm$^2$ (below the limit of detection with a total reflecting fluorescent X-ray analyzer);

(3) Cr contamination in the case where the test pipe 36 was a stainless steel pipe (electropolished SUS 316L pipe) that had a Ni (with P) coating in the area which would come into contact with ozone gas: $<1 \times 10^{10}$ atms/cm$^2$ (below the limit of detection with a total reflecting fluorescent X-ray analyzer);

(4) Cr contamination in the case where the test pipe 36 was a Teflon (PFA) pipe: $<1 \times 10^{10}$ atms/cm$^2$ (below the limit of detection with a total reflecting fluorescent X-ray analyzer).

The parts of the ozone gas delivery path located downstream of the ozone generating cell 11 which are to come into contact with ozone gas may be composed of or coated with other materials than aluminum and Teflon, as exemplified by aluminum alloys, fluorinated nickel (Ni), silicon oxide ($SiO_2$) based glass such as high-purity silica glass, and high-purity aluminum oxide ($Al_2O_3$) such as high-purity sapphire. These materials may be used either alone or in admixture with themselves.

The feed gas to be supplied to the ozone generating cell 11 shown in FIG. 1 may be either oxygen gas containing or supplemented with nitrogen or a compound thereof or oxygen gas containing or supplemented with fluorine or a compound thereof or both kinds of oxygen gas.

If desired, at least those parts of the ozone gas flow path extending from the ozone gas outlet 25 of the ozonizer 10 to a process using the ozone gas generated in said ozonizer 10 which are to come into contact with the ozone gas may use at least one material selected from among aluminum (Al), an aluminum alloy, Teflon, fluorinated nickel (Ni), a nickel alloy, a silicon oxide ($SiO_2$) based glass such as high-purity silica glass and aluminum oxide ($Al_2O_3$) such as high-purity sapphire. Needless to say, this approach is capable of supplying the process of interest with ozone gas that is not contaminated by Cr compounds.

While the preferred embodiment of the present invention as it relates to an ozonizer has been described above, it should be noted that the invention is by no means limited to this particular case. The heart of the invention is that the ozone gas delivery path located downstream of the high-purity ozone gas generating cell uses a Cr-free material in those parts which are to come into contact with ozone gas and it goes without saying that ozone may be generated by any mechanism as long as this requirement of the invention is met.

As described in the foregoing pages, the ozonizer of the invention is such that the ozone gas delivery path located downstream of the ozone generating cell uses a Cr-free material in at least those which are to come into contact with ozone gas and this eliminates the chance of the generation of Cr compounds in the ozone gas delivery path located downstream of the ozone generating cell. Hence, the ozonizer of the invention is capable of producing ozone gas that is not contaminated with Cr compounds.

What is claimed is:

1. An ozonizer, comprising:

an ozone generating cell for generating an ozone gas from a feed gas;

a high-voltage source for applying a high voltage on the ozone generating cell so as to change the feed gas into the ozone gas; and a delivery path for delivering the ozone gas, the delivery path being located outside and downstream of the ozone-generating cell, the delivery path comprising a substrate containing chromium and a coating coated onto the substrate, the coating consisting essentially of a material free of chromium.

2. An ozonizer according to claim 1, wherein the coating consists essentially of at least one material selected from the group consisting of aluminum, an aluminum alloy, Teflon, fluorinated nickel, a nickel alloy, a silicon oxide based glass and a high-purity aluminum oxide.

3. An ozonizer according to claim 1, wherein the coating consists essentially of at least one material selected from the group consisting of Teflon, fluorinated nickel, and a nickel alloy.

4. An ozonizer according to claim 1, wherein the delivery path comprises a pressure regulating valve, a gas filter located downstream of the pressure regulating valve, a first pipe connecting the ozone generating cell and the pressure regulating valve, and a second pipe connecting the pressure regulating valve and the gas filter.

5. An ozonizer according to any one of claims 2, 4 or 1, wherein the coating consists essentially of at least one material selected from the group consisting of fluorinated nickel and nickel alloys.

6. An ozonizer according to any one of claims 2, 4 or 1, wherein said ozone generating cell is supplied with a feed gas which is an oxygen gas containing or supplemented with nitrogen or a compound thereof.

7. An ozonizer according to any one of claims 2, 4 or 1, wherein said ozone generating cell is supplied with a feed gas which is an oxygen gas containing or supplemented with fluorine or a compound thereof.

8. An ozonizer according to any one of claims 2, 4 or 1, wherein said ozone generating cell is supplied with two feed gases, one being an oxygen gas containing or supplemented with nitrogen or a compound thereof and the other being an oxygen gas containing or supplemented with fluorine or a compound thereof.

9. An ozonizer according to any one of claims 2, 4 or 1, wherein at least those parts of the ozone gas flow path extending from said ozonizer to a process using the ozone gas generated in said ozonizer which are to come into contact with the ozone gas use at least one material selected from among aluminum, an aluminum alloy, Teflon, fluorinated nickel, a nickel alloy, a silicon oxide based glass and a high-purity aluminum oxide.

10. An ozonizer according to claim 3, wherein the delivery path comprises a pressure regulating valve, a gas filter located downstream of the pressure regulating valve, a first pipe connecting the ozone generating cell and the pressure regulating valve, and a second pipe connecting the pressure regulating valve and the gas filter.

11. An ozonizer, comprising:

an ozone generating cell for generating an ozone gas from a feed gas;

a high-voltage source for applying a high voltage to the ozone generating cell so as to change the feed gas into the ozone gas;

a delivery path for delivering the ozone gas, the delivery path being located outside and downstream of the ozone-generating cell, the delivery path comprising a part which is to come into contact with the ozone gas, the part consisting essentially of a material free of chromium, the part consisting essentially of at least one material selected from the group consisting of fluorinated nickel and nickel alloys.

* * * * *